(12) United States Patent
Nakagawa

(10) Patent No.: US 9,994,255 B2
(45) Date of Patent: Jun. 12, 2018

(54) VEHICLE GUIDANCE APPARATUS AND VEHICLE GUIDANCE METHOD

(71) Applicant: HONDA MOTOR CO., LTD., Tokyo (JP)

(72) Inventor: Tomoaki Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 14/325,372

(22) Filed: Jul. 8, 2014

(65) Prior Publication Data

US 2015/0057932 A1 Feb. 26, 2015

(30) Foreign Application Priority Data

Aug. 26, 2013 (JP) ................................. 2013-174453

(51) Int. Cl.
*B60L 11/18* (2006.01)
*B62D 15/02* (2006.01)
*B60L 3/00* (2006.01)

(52) U.S. Cl.
CPC .......... *B62D 15/029* (2013.01); *B60L 11/182* (2013.01); *B60L 11/1829* (2013.01);
(Continued)

(58) Field of Classification Search
CPC .............. B60L 11/1809; B60L 11/1838; B60L 2230/16; B60L 11/182; B60L 11/1833;
(Continued)

(56) References Cited

U.S. PATENT DOCUMENTS

| | | | |
|---|---|---|---|
| 2010/0117596 A1* | 5/2010 | Cook | B60L 11/182 320/108 |
| 2010/0161217 A1* | 6/2010 | Yamamoto | B60L 3/0046 701/408 |
| 2015/0298565 A1* | 10/2015 | Iwamura | G06Q 50/10 701/22 |

FOREIGN PATENT DOCUMENTS

| | | |
|---|---|---|
| JP | 2010-93944 | 4/2010 |
| JP | 2010-172185 | 8/2010 |

(Continued)

OTHER PUBLICATIONS

Japanese Office Action for corresponding JP Application No. 2013-174453, dated Jul. 26, 2016 (w/ English machine translation).

*Primary Examiner* — Kimberly S Berona
*Assistant Examiner* — Jordan S Fei
(74) *Attorney, Agent, or Firm* — Mori & Ward, LLP

(57) ABSTRACT

A vehicle guidance apparatus includes a power supplying parameter acquisition device, a power receiving parameter storage device, a charge efficiency calculator, and a display processing device. The power supplying parameter acquisition device is configured to acquire in a electric vehicle a power supplying parameter which corresponds to a specification of a power supplier. The power receiving parameter storage device is configured to store a power receiving parameter corresponding to a specification of a power receiver. The charge efficiency calculator is configured to calculate a charge efficiency according to a relative position between the power supplier and the power receiver based on the power supplying parameter and the power receiving parameter. The display processing device is configured to display on a display a range of the charge efficiency with respect to a center of the power receiver to guide the electric vehicle.

22 Claims, 12 Drawing Sheets

(52) U.S. Cl.
CPC ....... *B60L 11/1833* (2013.01); *B60L 11/1835* (2013.01); *B60L 3/0046* (2013.01); *B60L 2230/16* (2013.01); *B60L 2250/10* (2013.01); *B60L 2250/16* (2013.01); *Y02T 10/6269* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(58) Field of Classification Search
CPC . B60L 3/0046; B62D 15/029; Y02T 10/6269; Y02T 90/163; Y02T 10/7088; Y02T 10/7005; Y02T 90/128; Y02T 90/122; Y02T 90/125; Y02T 90/121; Y02T 90/14
See application file for complete search history.

(56) References Cited

FOREIGN PATENT DOCUMENTS

| | | |
|---|---|---|
| JP | 2011-217460 | 10/2011 |
| JP | 2012-105537 | 5/2012 |
| JP | 2012-120288 | 6/2012 |
| JP | 2012-210008 | 10/2012 |

\* cited by examiner

FIG. 5

| POWER RECEIVING UNIT / POWER SUPPLYING UNIT | TYPE A (CIRCULAR) | TYPE B (CIRCULAR) | TYPE C (RECTANGULAR) | TYPE D (RECTANGULAR) | TYPE E (ELLIPTICAL) |
|---|---|---|---|---|---|
| TYPE A (CIRCULAR) | 85% / 90% | — | — | — | — |
| TYPE B (CIRCULAR) | — | — | — | — | — |
| TYPE C (RECTANGULAR) | — | — | 85% / 90% | — | — |
| TYPE D (RECTANGULAR) | — | — | — | — | — |
| TYPE E (ELLIPTICAL) | — | — | — | — | 85% / 90% |

VEHICLE GUIDANCE APPARATUS AND VEHICLE GUIDANCE METHOD

CROSS-REFERENCE TO RELATED APPLICATIONS

The present application claims priority under 35 U.S.C. §119 to Japanese Patent Application No. 2013-174453, filed Aug. 26, 2013, entitled "Vehicle Guidance Apparatus." The contents of this application are incorporated herein by reference in their entirety.

BACKGROUND

1. Field

The present disclosure relates to a vehicle guidance apparatus and a vehicle guidance method.

2. Description of the Related Art

A vehicle guidance apparatus has been proposed for aligning (matching) the position of a power receiving unit in the vehicle with (to) the position of a power supplying unit on the ground side when non-contact charging is performed.

Japanese Unexamined Patent Application Publication (JP-A) No. 2011-217460 discloses a charge assistance device for vehicles by which when a vehicle is parked in a parking frame under which a power supplying unit is buried, a position at which a highest charge efficiency is achieved by avoiding obstacles and the charge efficiency are displayed on an in-vehicle display device so as to guide the vehicle (see [0052], [0053] in JP-A No. 2011-217460).

In the above situation, the charge efficiency is highest when the central axis of the coil of the power supplying unit and the central axis of the coil of a power receiving unit match each other, and has the characteristics such that the charge efficiency reduces as the displacement between the positions of the central axes increases. The charge efficiency is pre-stored as a charge efficiency map in a data storage unit of the vehicle (see [0027], [0029], [0047], FIG. 1, FIG. 4 in JP-A No. 2011-217460).

Japanese Unexamined Patent Application Publication (JP-A) No. 2012-210008 discloses a display device for vehicles that displays a power receiving unit of the vehicle and a power supplying device outside the vehicle on an in-vehicle display device when non-contact charging is performed, and in consideration of the remaining capacity of a storage battery, when the remaining capacity is low, the guide line for guiding the power receiving unit to the power supplying device is displayed with a thin line, whereas when the remaining capacity is high, the guide line is displayed with a thick line so that the charge efficiency and reduction of stress of a driver for positioning the vehicle are taken into consideration ([0023], [0025] in JP-A No. 2012-210008).

SUMMARY

According to one aspect of the present invention, a vehicle guidance apparatus includes a power supplying parameter acquisition unit, a power receiving parameter storage unit, a charge efficiency calculation unit, and a display processing unit. The vehicle guidance apparatus is to be mounted on an electric vehicle that receives supply power by a power receiving unit in the vehicle in a non-contact manner, charges a power storage device mounted in the vehicle by the received power, and is driven at least by the power stored in the power storage device. The supply power is supplied from a power supplying unit on the ground side. The vehicle guidance apparatus is for guiding the electric vehicle so that a relative position between the power receiving unit and the power supplying unit is in a predetermined range. The power supplying parameter acquisition unit is configured to acquire a power supplying parameter in the vehicle. The power supplying parameter corresponds to a specification of the power supplying unit. The power receiving parameter storage unit is configured to store a power receiving parameter corresponding to a specification of the power receiving unit. The charge efficiency calculation unit is configured to calculate a charge efficiency according to the relative position between the power supplying unit and the power receiving unit based on the power supplying parameter and the power receiving parameter. The display processing unit is configured to display a range of the charge efficiency with respect to a center of the power receiving unit on a display unit.

According to another aspect of the present invention, a vehicle guidance apparatus includes a power supplying parameter acquisition device, a power receiving parameter storage device, a charge efficiency calculator, and a display processing device. The vehicle guidance apparatus is to be mounted on an electric vehicle including a power receiver configured to receive supply power in a non-contact manner from a power supplier provided on a ground side to charge a storage device. The power supplying parameter acquisition device is configured to acquire in the electric vehicle a power supplying parameter which corresponds to a specification of the power supplier. The power receiving parameter storage device is configured to store a power receiving parameter corresponding to a specification of the power receiver. The charge efficiency calculator is configured to calculate a charge efficiency according to a relative position between the power supplier and the power receiver based on the power supplying parameter and the power receiving parameter. The display processing device is configured to display on a display a range of the charge efficiency with respect to a center of the power receiver to guide the electric vehicle.

According to further aspect of the present invention, in a vehicle guidance method, a power supplying parameter which corresponds to a specification of a power supplier provided on a ground side is acquired in an electric vehicle. A power receiving parameter corresponding to a specification of a power receiver which is provided in the electric vehicle and which is configured to receive supply power in a non-contact manner from the power supplier to charge a storage device is stored. A charge efficiency is calculated according to a relative position between the power supplier and the power receiver based on the power supplying parameter and the power receiving parameter. A range of the charge efficiency with respect to a center of the power receiver is displayed on a display to guide the electric vehicle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 5 is a compatibility characteristics table that stores a charging efficiency according to the types of a power supplying unit and a power receiving unit.

DESCRIPTION OF THE EMBODIMENTS

Figure 1:
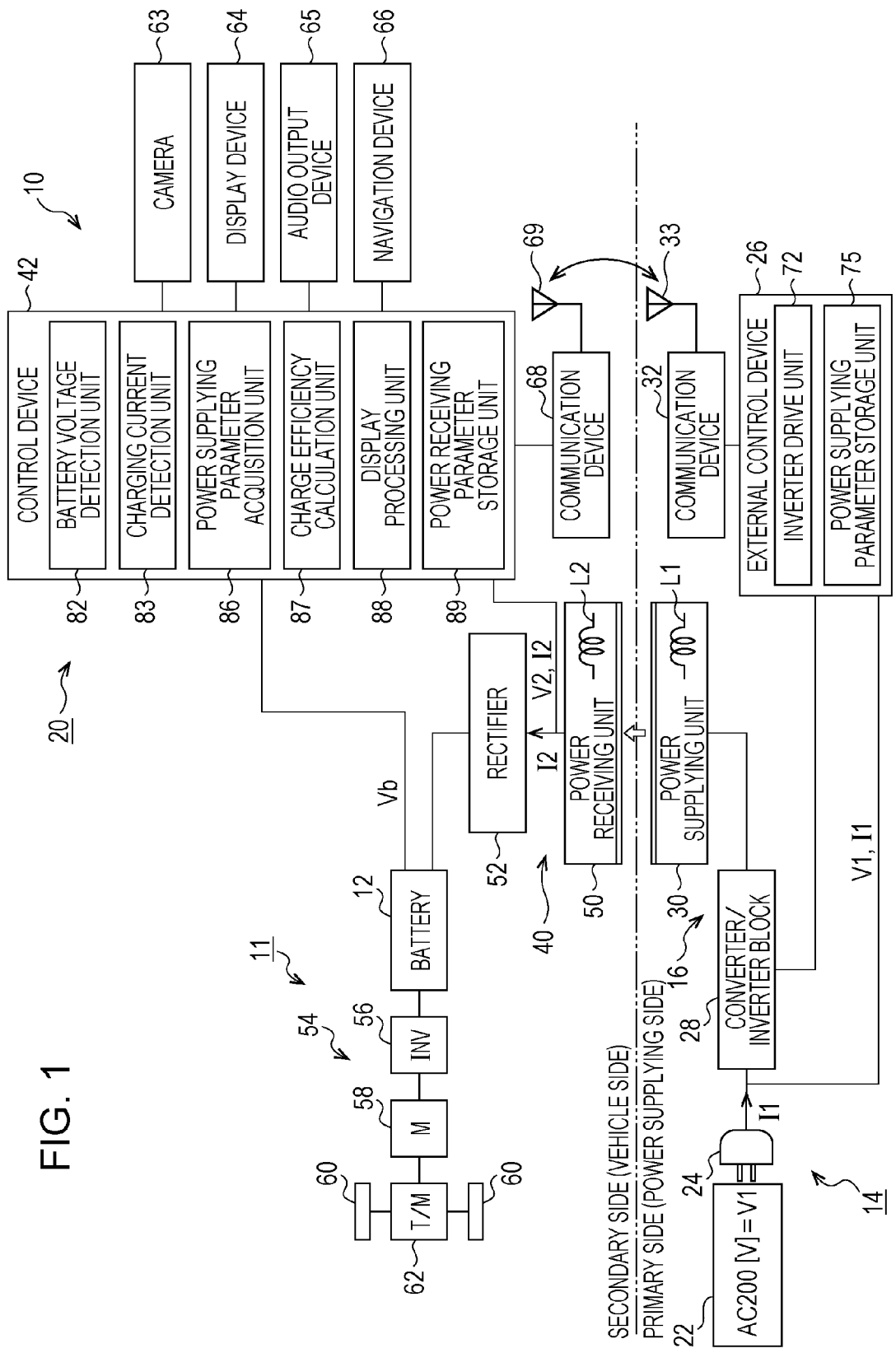
FIG. 1 is a schematic configuration diagram of a non-contact charging system that charges power to an electric vehicle in a non-contact manner, the electric vehicle being equipped with a vehicle guidance apparatus according to an embodiment of the present disclosure.

The embodiments will now be described with reference to the accompanying drawings, wherein like reference numerals designate corresponding or identical elements throughout the various drawings.

Hereinafter, a vehicle guidance apparatus according to an embodiment of the present disclosure will be described in detail through a relationship with an electric vehicle in which the vehicle guidance apparatus is mounted, with reference to the accompanying drawings.

FIG. 1 illustrates a schematic configuration diagram of a non-contact charging system 20 that includes an electric vehicle 11 equipped with a vehicle guidance apparatus 10 according to the present embodiment, and an external power supplying apparatus 14 to charge a battery 12 (power storage device) such as a lithium ion battery mounted in the electric vehicle 11 in a non-contact manner. In FIG. 1, the components above the two-dot chain line indicate the electric vehicle 11 which is the secondary side (vehicle side), and the components below the line indicate the external power supplying apparatus 14 which is the primary side (power supplying side).

Figure 2:
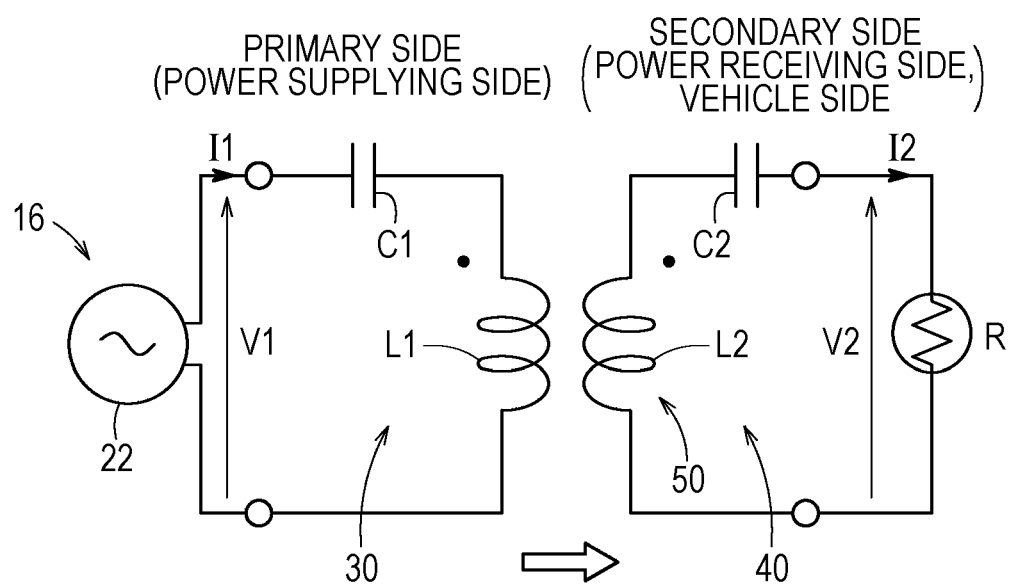
FIG. 2 is a simple equivalent circuit diagram of the non-contact charging system.

FIG. 2 is a simple equivalent circuit diagram of the non-contact charging system 20 illustrated in FIG. 1. In the present embodiment, a magnetic resonance system as a non-contact power transmission system will be described as an example. However, the present disclosure is also applicable to a non-contact charging using electromagnetic induction, in addition to a magnetic resonance system.

In FIGS. 1 and 2, the external power supplying apparatus 14 as the primary side (power supplying side) basically includes a power supplying circuit 16 and an external control device 26.

The power supplying circuit 16 includes AC power supply device 22 of AC200 [V] (primary voltage V1=200 [V]); a converter inverter block 28 connected to the power source plug 24; and a power supplying unit (a power transmission unit, a power transmission antenna) 30 on the primary side (power supplying side) having a primary capacitor C1 and a power supplying coil (primary coil) L1 for resonance. The power supplying unit 30 is laid underground so that the upper end thereof is, for example, flush or nearly flush with the ground or is higher than the ground by a predetermined height or lower.

For example, when the power supplying coil L1 is laid underground with the upper end nearly flush with the ground, a charge position sign (charge sign) (charge sign 112 of FIG. 8 described below) corresponding to the outline of the power supplying coil L1 is depicted at the burial position of the power supplying coil L1.

Figure 3A:
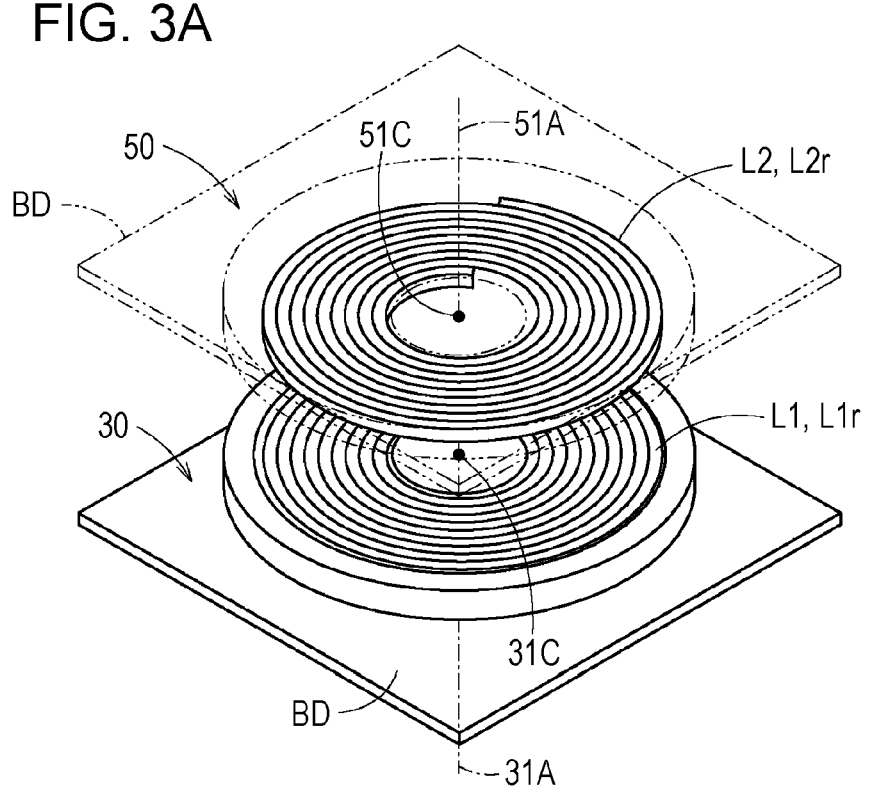
FIG. 3A is a schematic perspective view illustrating a manner in which a power receiving unit and a power supplying unit of circular coils face each other.
Figure 3B:
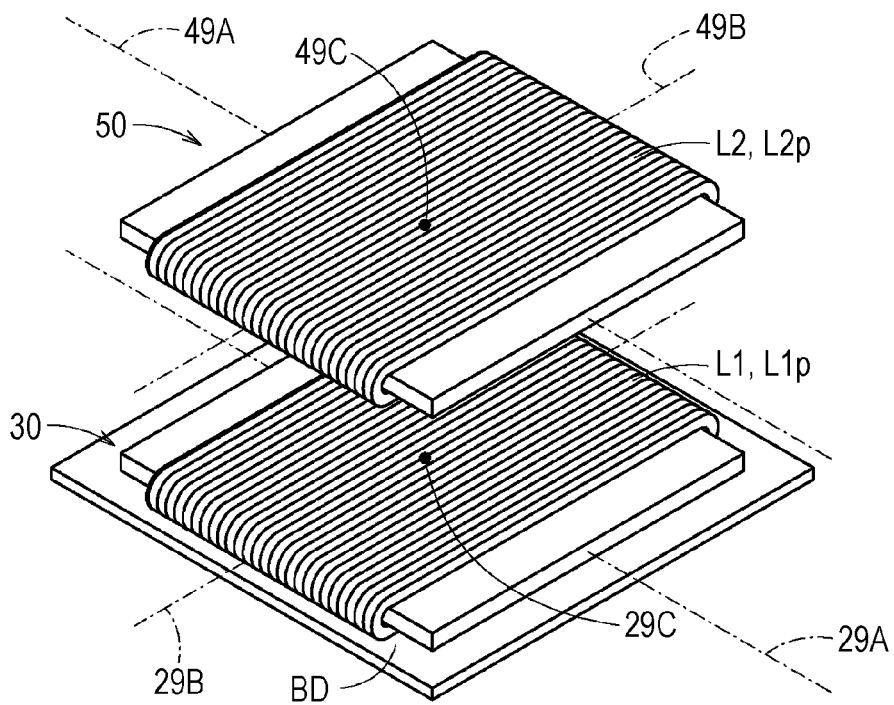
FIG. 3B is a schematic perspective view illustrating a manner in which a power receiving unit and a power supplying unit of rectangular coils face each other.

When the power supplying coil L1 is a circular coil as illustrated in FIG. 3A, for example, a circular charge sign is drawn as a charge sign, the circular charge sign indicating the outer circumference of a circular coil in plan a view. When the power supplying coil L1 is a rectangular prism coil (hereinafter simply referred to as a rectangular coil) as illustrated in FIG. 3B, for example, a rectangular charge sign is drawn.

In FIG. 1, the external control device 26 detects AC power of the AC power supply device 22 as supply power P1 (P1=V1×I1, V1 is the primary voltage as AC voltage, I1 is the primary current as AC current) and controls (turn-on, turn-off, and duty variable control) the converter inverter block 28 to be driven. The external control device 26 is connected to a communication device 32 on which a ground-side antenna 33 is mounted. Further details of the function of the external control device 26 will be described later.

On the other hand, in addition to the battery 12, the electric vehicle 11 basically includes, a power receiving circuit 40 on the secondary side (power receiving side, load side), a control device 42 that controls the charge from the power supplying circuit 16 to the battery 12, and a vehicle propulsion unit 54. It should be noted that the control device 42 may include a battery control device what is called a battery electronic control unit (ECU), and a charge control device ECU that controls the entire non-contact charging system 20 in a separate manner.

The power receiving circuit 40 includes a power receiving unit (power receiving antenna) 50 having a secondary capacitor C2 and a power receiving coil (secondary coil) L2 for resonance, and a rectifier 52 that rectifies receive power (load power) P2 which is the AC power received by the power receiving coil L2. The power receiving power P2 is expressed by the product (P2=V2×I2) of a load voltage (secondary voltage) V2 and a charging current I2, the load voltage being the output voltage of the power receiving circuit 40, the charging current being the output current of the power receiving circuit 40 as the secondary current which flows into the rectifier 52. The power receiving power P2 is detected by the control device 42. The power receiving unit 50 is disposed, for example, at the base under the trunk of the electric vehicle 11.

FIG. 3A schematically illustrates the manner in which the power receiving coil L2 included in the power receiving unit 50 mounted in the electric vehicle 11, and the power supplying coil L1 included in the power supplying unit 30 on the ground side face each other. In this example, the power receiving coil L2 and the power supplying coil L1 are each formed as a circular coil in which an insulation coated wire is wound in a spiral in a doughnut-shaped recess which is formed on the major surface of a flat circular core in the same shape with the same specification. Hereinafter, in the case of a circular coil, the power receiving coil L2 is referred to as the power receiving coil L2r, and the power supplying coil L1 is referred to as the power supplying coil L1r as necessary.

Here, the power receiving center of the power receiving coil L2r, which is a circular coil, indicates a center 51C of the rings of the coil, and the central axis of a circular coil indicates an axis 51A which is through the center (power receiving center 51C) of the rings of the coil and extends in a vertical direction same as the direction of a magnetic path. It should be noted that FIG. 3A also illustrates the power supplying center 31C and the central axis 31A of the power supplying unit 30.

In FIG. 3A, the power receiving coil L2r and the power supplying coil L1r face each other, and thus the central axis 51A of the power receiving unit 50 and the central axis 31A of the power supplying unit 30 are aligned and the distance between the power receiving center 51C and the power supplying center 31C is the shortest. Consequently, the transmission efficiency of non-contact charging is the highest (which is referred to as a highest transmission efficiency state or a highest charging efficiency state). The non-contact charging efficiency reduces as the distance between the power receiving center 51C and the power supplying center 31C deviates from the shortest distance.

FIG. 3B schematically illustrates the manner in which the power receiving coil L2 included in the power receiving unit 50 mounted in the electric vehicle 11, and the power supplying coil L1 included in the power supplying unit 30 on the ground side face each other. In this example, the power receiving coil L2 and the power supplying coil L1 are each formed as a rectangular coil in which an insulation coated wire is wound around a flat rectangular parallelepiped core in the same shape with the same specification. Hereinafter, in the case of a rectangular coil, the power receiving coil L2 is referred to as the power receiving coil L2p, and the power supplying coil L1 is referred to as the power supplying coil L1p as necessary.

Here, the power receiving center of the power receiving coil L2p, which is a rectangular coil, indicates the center (referred to as a power receiving center 49C) of the rectangular parallelepiped core, and the central axis of a rectangular coil indicates an axis 49A which is through the center (power receiving center 49C) of the rectangular parallelepiped core and extends in a direction parallel to the direction of a magnetic path. It should be noted that an axis which is perpendicular to the direction of a magnetic path and through the power receiving center 49C is referred to as an axis 49B. It should be noted that FIG. 3B also illustrates the power supplying center 29C of the power supplying coil L1p, a central axis 29A of the power supplying unit 30, and an axis 29B which is perpendicular to the central axis 29A.

Also in this case, because the power receiving coil L2p and the power supplying coil L1p face each other in FIG. 3B, the central axis 49A and the axis 49B of the power receiving unit 50 and the central axis 29A and the axis 29B of the power supplying unit 30 are aligned with each other in a plan view, the distance between the power receiving center 49C and the power supplying center 29C is the shortest with no misregistration, and thus the transmission efficiency of non-contact charging is the highest (which is referred to as the highest transmission efficiency state or the highest charging efficiency state). Also in this case, the non-contact charging efficiency reduces as the distance between the power receiving center 49C and the power supplying center 29C deviates from the shortest distance.

In FIGS. 3A and 3B, a shield plate BD for electric field is disposed under the lower surface of the power supplying coil L1.

After the electric vehicle 11 is moved (guided) so that the power supplying unit 30 (power supplying coil L1) and the power receiving unit 50 (power receiving coil L2) are made to face (be opposed to) each other, charging to the battery 12 by non-contact power transmission, what is called non-contact charging is performed while the electric vehicle is stopped or parked.

As illustrated in FIG. 1, the battery 12 is connected to the vehicle propulsion unit 54 that is controlled by a vehicle propulsion control device which is not illustrated. The vehicle propulsion unit 54 includes an inverter 56 that converts the voltage (battery voltage) Vb of the battery 12 to AC voltage, a motor generator 58 for vehicle propulsion to be driven by the inverter 56, and a transmission 62 that transmits torque of the motor generator 58 to drive wheels 60. The present disclosure is directed to non-contact power transmission from the external power supplying circuit 16 when the electric vehicle 11 is stopped or parked, and thus description of detailed configuration and operation of the vehicle propulsion unit 54 will be omitted.

In addition to an electric vehicle so-called EV, the electric vehicle 11 according to the present embodiment has application to a hybrid vehicle, a range extender automobile each equipped with an engine, and a fuel cell automobile equipped with fuel cells.

The electric vehicle 11 includes the control device 42. In addition to the battery 12 and the power receiving unit 50, the control device 42 includes a camera 63 as an image capture device, a display device 64 that also serves as multi-information display, a sound output device 65 such as a loudspeaker, a navigation device 66, and a communication device 68 having a vehicle-side antenna 69 that performs wireless communications with the external control device 26.

For the use of the camera 63, when the mounting position of the power receiving coil L2 is under the front of the electric vehicle 11, a front camera is used, whereas when the mounting position of the power receiving coil L2 is under the rear of the electric vehicle 11, a rear camera is used.

In the present embodiment, the power receiving coil L2 is disposed under the rear (the base of the trunk) of the electric vehicle 11. Thus, as illustrated in the schematic plan view of FIG. 4A, in a vehicle such as a sedan, the camera 63 is provided near the rear center of the trunk, and in a vehicle such as a minivan, a rear camera is provided near the outer center of the tail gate.

Figure 4A:
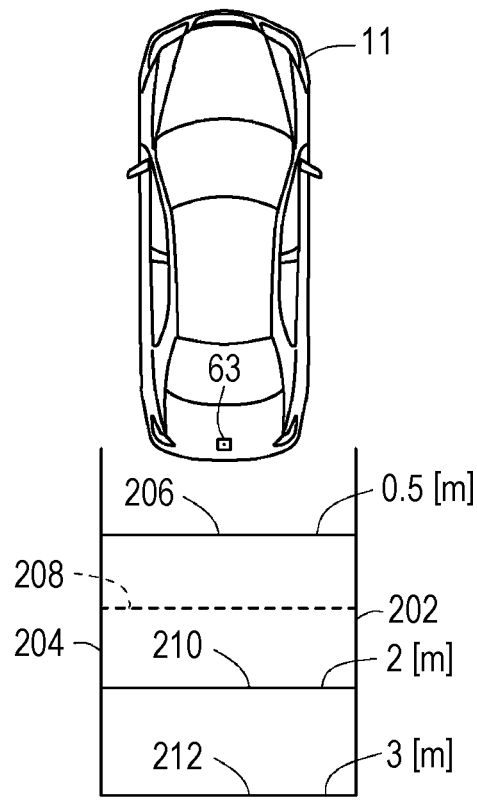
FIG. 4A is an example correspondence explanatory diagram in plan view of a parking guide line position and a vehicle position.
Figure 4B:
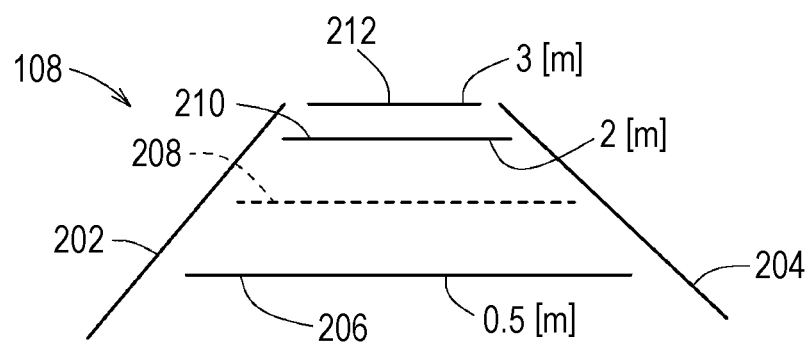
FIG. 4B is an explanatory diagram of an image of a parking guide line displayed on a screen.

When a charge preparation switch (not illustrated) is in on-state or the gear is in reverse position, as illustrated in FIG. 4B, on the display device 64, a normal guide line (parking assistance guide line) 108 for parking assistance is superimposed and displayed by a display processing unit 88 on an image of the rear of the electric vehicle 11 captured by the camera 63. In the present embodiment, the below-described charge efficiency range is further superimposed on the superimposed display image as an image (charge efficiency guide line).

As seen from the correspondence explanatory diagram in plan view of actual situation illustrated in FIG. 4A and the image display illustrated in FIG. 4B, the parking assistance guide line 108 is indicated in such a manner that vehicle guide lines 202, 204 slightly wider than the vehicle width of the electric vehicle 11, a guide line 206 rear of a bumper by approximately 0.5 m, a guide line 208 at the time of tail gate opening, and guide lines 210, 212 corresponding to approximately 2 m, approximately 3 m, respectively are displayed by a semi-transparent yellow line.

In FIG. 1, the control device 42 and the external control device 26 are each configured with an ECU. The ECU is a computer including a microcomputer, and includes a central processing unit (CPU), a ROM (including also EEPROM) as a memory, a random access memory (RAM), an I/O device such as A/D converter, D/A converter, and a timer as a clocking unit. The CPU reads and executes a program recorded on the ROM, thereby functioning as various function implementation units (function implementation devices), for example, a control unit, an arithmetic unit, and a processing unit.

In the present embodiment, the external control device 26 included in the external power supplying apparatus 14 functions as an unit including an inverter drive unit 72 that performs pulse width modulation (PWM) drive control, which is duty control, on the converter inverter block 28.

The external control device 26 further includes a power supplying parameter storage unit 75 that stores a type corresponding to the specification of the power supplying unit 30 of the external power supplying apparatus 14, and/or a power supplying parameter corresponding to the specification of the power supplying unit 30.

The power-supplying parameter includes the characteristics (such as the number of coil turns, shape, coil diameter, Q value, inductance value, and operating frequency) of the power supplying coil L1. It should be noted that the type is classified into circular coil, rectangular coil, and elliptical coil in the present embodiment.

On the other hand, the control device 42 included in the vehicle guidance apparatus 10 functions as a battery voltage detection unit 82 that detects a voltage (battery voltage) Vb of the battery 12, as a charging current detection unit 83 that detects a charging current Ib (Ib=I2) which flows into the battery 12 through the rectifier 52, as a power supplying parameter acquisition unit 86, as a charge efficiency calculation unit 87, and as a display processing unit 88. The control device 42 includes a power receiving parameter storage unit 89 that stores the type corresponding to the specification of the power receiving unit 50 and/or the power receiving parameter that identifies the type. The power receiving parameter includes the characteristics (such as the number of coil turns, shape, coil diameter, Q value, inductance value, and operating frequency) of the power receiving coil L2. It should be noted that the type is classified into circular coil, rectangular coil, and elliptical coil in the present embodiment.

The charge efficiency calculation unit 87 stores a compatibility characteristics table (compatibility charge efficiency table) 100 illustrated in FIG. 5 which is used for calculating (retrieving) a charge efficiency $\eta$ according to the types and the relative position between the power supplying unit 30 and the power receiving unit 50.

The compatibility characteristics table 100 stores a charge efficiency range $\eta a$ with respect to the power receiving centers 49C, 51C (see FIGS. 3A and 3B) when the power receiving unit 50 and the power supplying unit 30 face each other, based on one of A to E which is the type of the power supplying unit 30 or the type of the power supplying unit 30 identified by the power supplying parameter, and on one of A to E which is the type of the power receiving unit 50 or the type of the power receiving unit 50 identified by the power receiving parameter.

Figure 6:
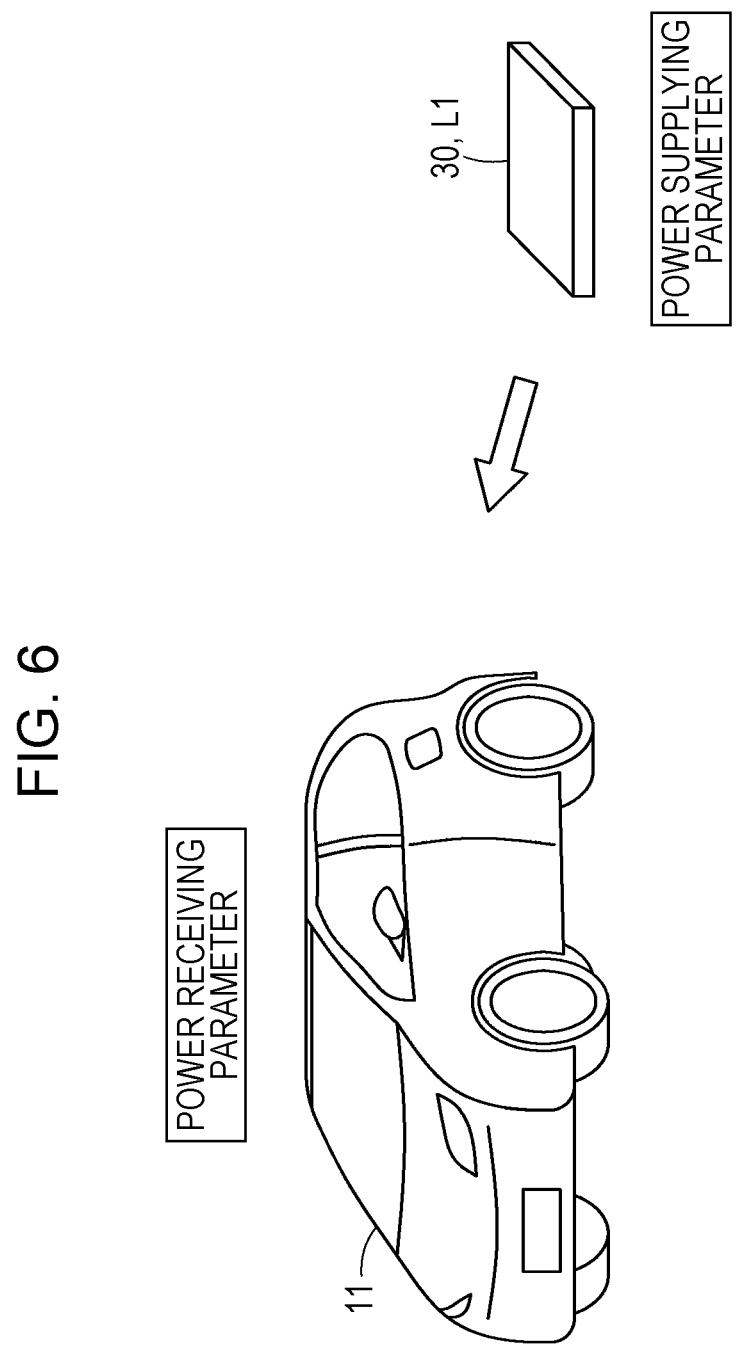
FIG. 6 is a conceptual explanatory diagram when an electric vehicle acquires a power supplying parameter of a power supplying unit.

For example, as illustrated in the conceptual explanatory diagram of FIG. 6, the charge efficiency calculation unit 87 acquires a power supplying parameter from the power supplying unit 30 (power supplying coil L1) to refer to the compatibility characteristics table 100 and retrieves or calculates a charge efficiency range $\eta a$ with respect to the power receiving centers 49C, 51C.

The retrieved or calculated charge efficiency range $\eta a$ is displayed via the display processing unit 88 on the display device 64 and/or a display device of the navigation device 66.

Figure 7:
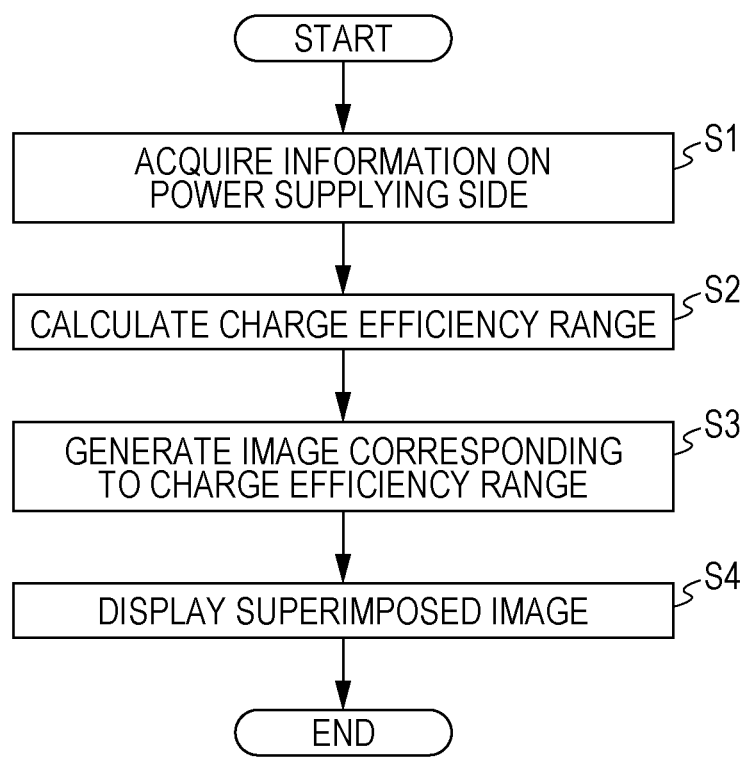
FIG. 7 is a flow chart for explaining an operation of the vehicle guidance apparatus according to the embodiment, included in the non-contact charging system.

The operation of the vehicle guidance apparatus 10 included in the non-contact charging system 20 having the basic configuration as described above will be described with reference to the flow chart of FIG. 7.

Figure 8:
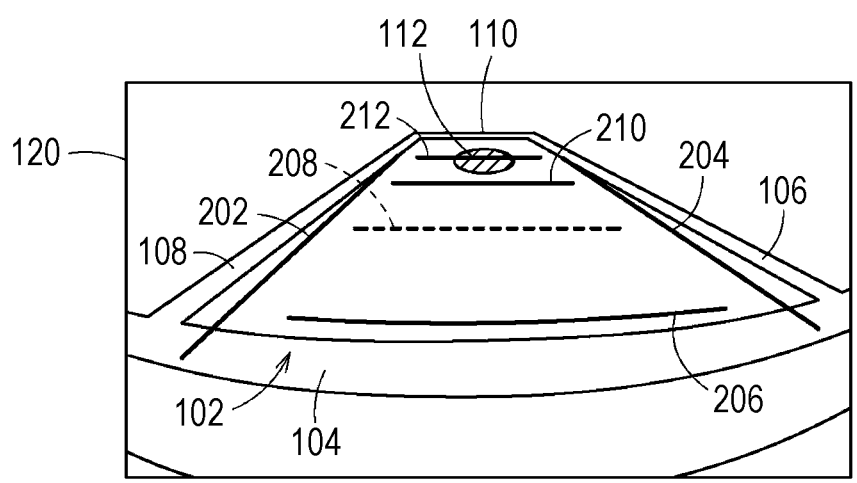
FIG. 8 is a schematic illustration of a charge position parking assistance image.

FIG. 8 illustrates an image 120 displayed on the screen of the display device 64, the image being captured by the camera 63 when the electric vehicle 11 is moved back and parked at a location immediately in front of a rectangular white line parking range 102.

It can be seen that the image 120 is displayed such that the white line parking range 102 is defined by near side white line 104, both side white lines 106, 108, and far side white line 110, and a charge sign (target) 112 is provided at a center position nearer from the far side white line 110. The power supplying unit 30 including the power supplying coil L1 is buried under the charge sign (target) 112.

The image 120 is a charge position parking assistance image for guiding (leading, face-to-face positioning) the power receiving unit 50 of the electric vehicle 11 to the charge sign (target) 112.

In this state, in step S1, the power supplying parameter acquisition unit 86 included in the control device 42 acquires a power supplying parameter or a type, that is, power supplying-side information, from the power supplying parameter storage unit 75 of the external control device 26 via the communication device 32, the ground-side antenna 33, the vehicle-side antenna 69, and the communication device 68.

In step S2, the charge efficiency calculation unit 87 identifies a power receiving unit type and a power supplying unit type based on the power supplying parameter acquired by the power supplying parameter acquisition unit 86 and the power receiving parameter stored by the power receiving parameter storage unit 89, and refers to the compatibility characteristics table 100 illustrated in FIG. 5 to calculate an allowable charge efficiency range (allowable charge efficiency range) $\eta a$ in which the charge efficiency $\eta$ is higher than or equal to 90[%] as an example.

When a charge efficiency range $\eta a$ is calculated for the power supplying coil L1 in a circular shape as illustrated in FIG. 3A, the calculation is performed in consideration of reduction in the charge efficiency η being uniform for deviation of the power receiving coil L2 in any direction from the power supplying center 31C of the power supplying coil L1.

When a charge efficiency range ηa is calculated for the power supplying coil L1 in a rectangular shape as illustrated in FIG. 3B and magnetic flux is generated in a front-rear direction (so-called a vehicle longitudinal direction) with respect to the parking position of the electric vehicle 11, the calculation is performed in consideration of the property of charge efficiency {less susceptible to a deviation of the power receiving coil L2 in a right-left direction (vehicle width direction)} that reduction in the charge efficiency η is higher for a deviation of the power receiving coil L2 in a front-rear direction, and reduction in the charge efficiency η is lower for a deviation of the power receiving coil L2 in a right-left direction (vehicle width direction). On the other hand, when magnetic flux is generated in a right-left direction (vehicle width direction) with respect to the parking position of the electric vehicle 11, the calculation is performed in consideration of the property of charge efficiency {less susceptible to a deviation of the power receiving coil L2 in a front-rear direction} that reduction in the charge efficiency η is higher for a deviation of the power receiving coil L2 in a right-left direction (vehicle width direction), and reduction in the charge efficiency η is lower for a deviation of the power receiving coil L2 in a front-rear direction.

However, when the types of the power receiving unit 50 and the power supplying unit 30 do not match, specifically, when the direction of magnetic flux and arrangement of the core form an unmatched combination, for example, for a combination of a circular coil and a rectangular coil, it is preferable to give a warning to a user such as a driver via the display device 64 and/or the sound output device 65, the warning indicating that the charge efficiency is extremely low and so full charge takes a substantially long time.

Subsequently, in step S3, the display processing unit 88 generates an image corresponding to the calculated charge efficiency range ηa, that is, (an image of) a charge efficiency range 122 (step S3). In step S4, as illustrated in FIG. 9A, the display processing unit 88 displays an image 120A by superimposing the generated image on the image 120 on the display device.

Figure 9A:
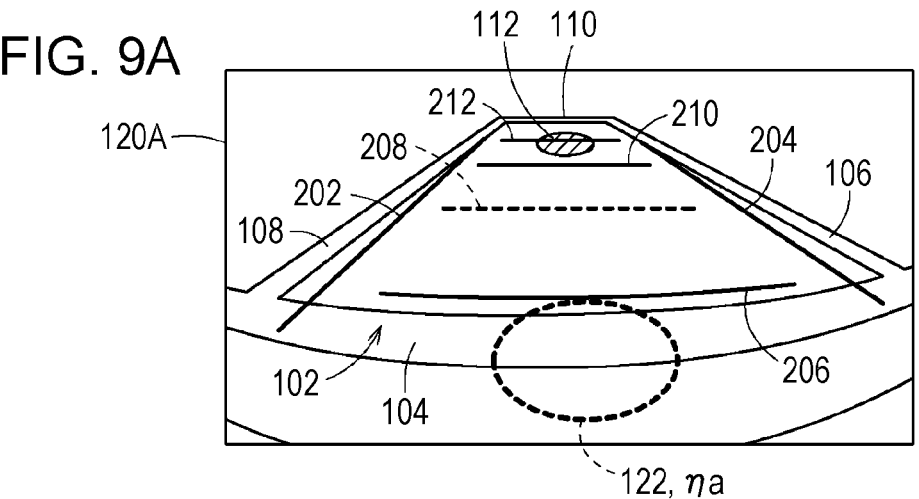
FIG. 9A is a schematic illustration of a charge position parking assistance image with additional display of a charging efficiency range of a power receiving center.

The image 120A in FIG. 9A illustrates the manner in which (the image of) the charge efficiency range 122 indicating the charge efficiency range ηa, signified by a circular frame (an elliptical frame is displayed on the image 120A because the lens of the camera 63 is a wide-angle lens) in which the charge efficiency η is 90[%] or higher is superimposed and displayed.

When the power supplying coil L1 is a circular coil (see FIG. 3A) or a rectangular coil (see FIG. 3B), in addition to the display of a circular charge efficiency range 122 as illustrated in FIG. 9A, it is preferable to display a rectangular charge range (not illustrated) which is defined by line segments in a front-rear direction and a right-left direction (vehicle width direction), instead of a circular charge efficiency range 122.

In the display of the image 120A illustrated in FIG. 9A, when a driver moves back and parks the electric vehicle 11 so that the charge sign (target) 112 is located within the charge efficiency range 122, it is possible to charge the battery 12 at a position which ensures a charge efficiency η of 90[%] or higher.

Figure 9B:
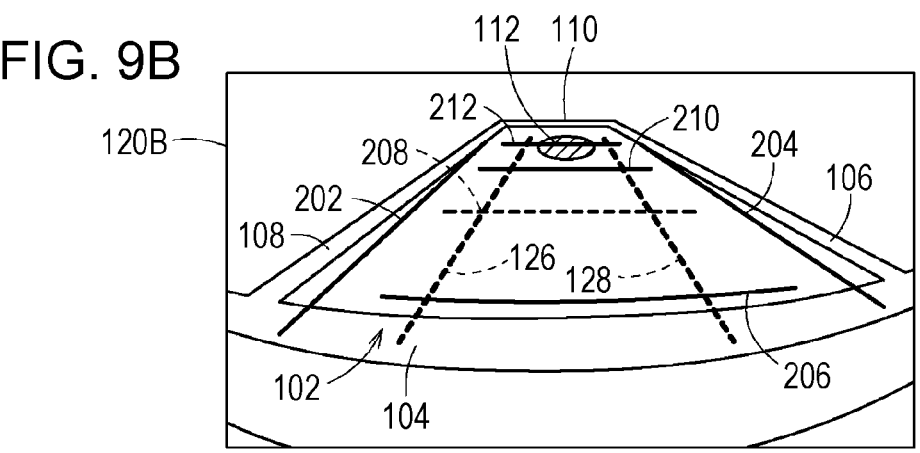
FIG. 9B is a schematic illustration of a charge position parking assistance image with additional display of another charging efficiency range of a power receiving center.
Figure 9C:
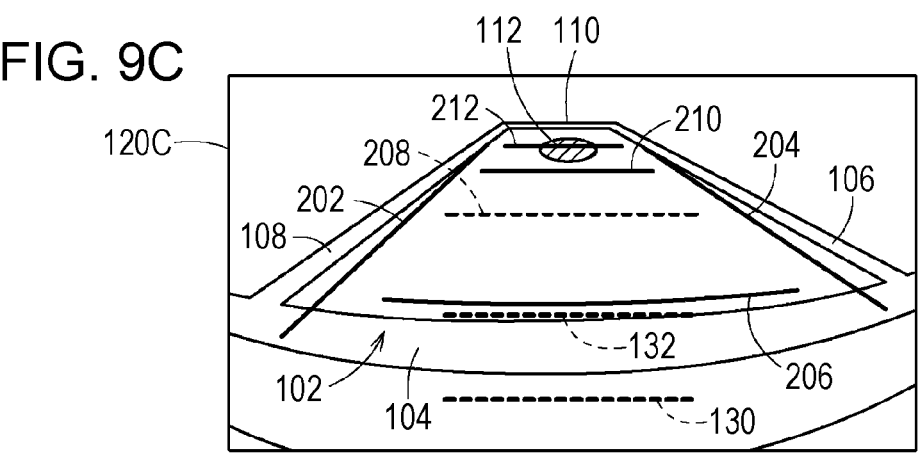
FIG. 9C is a schematic illustration of a charge position parking assistance image with additional display of still another charging efficiency range of a power receiving center.

When the power supplying coil L1 is a circular coil, charge efficiency range 126, 128 which are parallel to the vehicle width guide lines 202, 204 and in which the charge efficiency η is 90[%] or higher may be superimposed and displayed as illustrated in FIG. 9B, or charge efficiency range 130, 132, which are parallel to the vehicle width guide lines 206, 210 and indicated by parallel lines between which the charge efficiency η is 90[%] or higher, may be superimposed and displayed as illustrated in FIG. 9C.

When the power supplying coil L1 is a rectangular coil and magnetic flux is generated in a front-rear direction, higher reduction in the charge efficiency η due to a deviation in a front-rear direction may be taken into consideration, and charge efficiency range 130, 132, which are parallel to the vehicle width guide lines 206, 210 and indicated by parallel lines between which the charge efficiency η is 90[%] or higher, may be superimposed and displayed as illustrated in FIG. 9C. When the power supplying coil L1 is a rectangular coil and magnetic flux is generated in a right-left direction (vehicle width direction), higher reduction in the charge efficiency η due to a deviation in a right-left direction (vehicle width direction) may be taken into consideration, and charge efficiency range 126, 128, which are parallel to the vehicle width guide lines 202, 204 and indicated by parallel lines between which the charge efficiency η is 90[%] or higher, may be superimposed and displayed as illustrated in FIG. 9B.

In the case of the display of the image 120B illustrated in FIG. 9B, a driver may move back and park the electric vehicle 11 with the charge sign (target) 112 located within the charge efficiency range (lines) 126, 128 so that the amount of deviation between the power supplying center axis 31A of the power supplying unit 30 (power supplying coil L1r) and the power receiving center axis 51A of the power receiving unit 50 (power receiving coil L2r) falls within a predetermined deviation in the example of circular coils of FIG. 3A, and the amount of deviation between the axis 29B of the power supplying unit 30 (power supplying coil L1p) and the axis 49B of the power receiving unit 50 (power receiving coil L2p) falls within a predetermined deviation in a right-left direction (vehicle width direction) in the example of rectangular coils of FIG. 3B.

In the case of the display of the image 120C illustrated in FIG. 9C, when a driver moves back and parks the electric vehicle 11 with the charge sign (target) 112 located within the charge efficiency range (lines) 130, 132, the amount of deviation between the power supplying center axis 31A of the power supplying unit 30 (power supplying coil L1r) and the power receiving center axis 51A of the power receiving unit 50 (power receiving coil L2r) falls within a predetermined deviation in the example of circular coils of FIG. 3A, and the amount of deviation between the axis 29B of the power supplying unit 30 (power supplying coil L1p) and the axis 49B of the power receiving unit 50 (power receiving coil L2p) falls within a predetermined deviation in a front-rear direction in the example of rectangular coils of FIG. 3B. Thus, it is possible to charge the battery 12 at a position which ensures a charge efficiency η of 90[%] or higher.

Figure 10A:
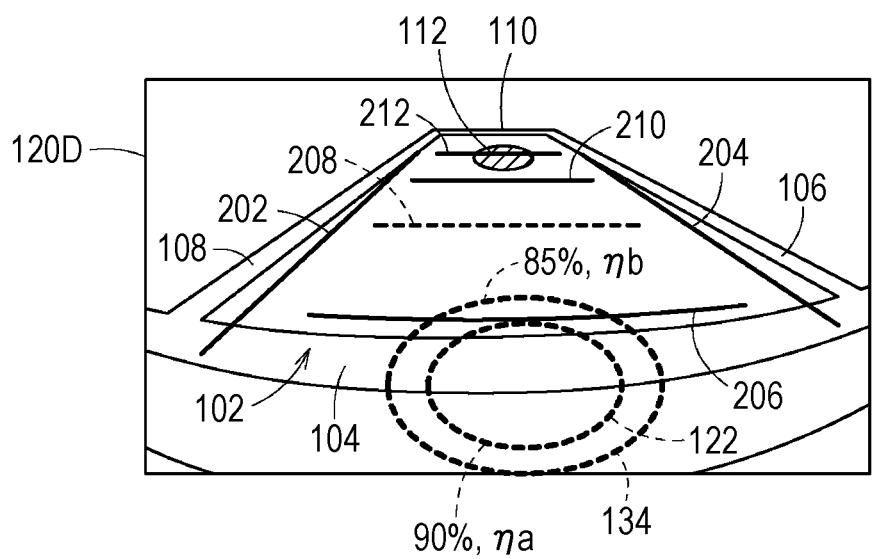
FIG. 10A is a schematic illustration of a charge position parking assistance image with additional display of a plurality of charging efficiency ranges of a power receiving center.

As illustrated in image 120D of FIG. 10A, a charge efficiency range 134 (ηa) indicated by a circular frame in which the charge efficiency η is 85[%] or higher may be further superimposed and displayed outwardly and concentrically with the charge efficiency range 122 (ηa) indicated by a circular frame in which the charge efficiency η is 90[%] or higher.

A driver moves back and parks the electric vehicle 11 with the charge sign (target) 112 located within the charge efficiency range 134, thereby making it possible to charge the battery 12 at a position which ensures a charge efficiency η of 85[%] or higher.

Figure 10B:
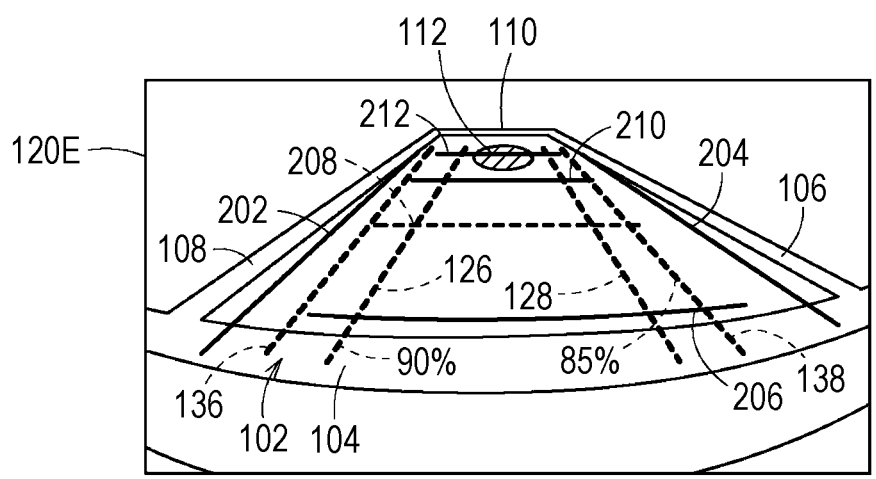
FIG. 10B is a schematic illustration of a charge position parking assistance image with additional display of another plurality of charging efficiency ranges of a power receiving center.

Similarly, as illustrated in the image 120E of FIG. 10B, charge efficiency range 136, 138 of 85[%] or higher may be further superimposed and displayed outwardly and concentrically with the charge efficiency range 126, 128 of 90[%] or higher.

A driver moves back and parks the electric vehicle 11 with the charge sign (target) 112 located within the charge efficiency range 136, 138, thereby making it possible to charge the battery 12 at a position which ensures a charge efficiency η of 85[%] or higher.

Figure 11:
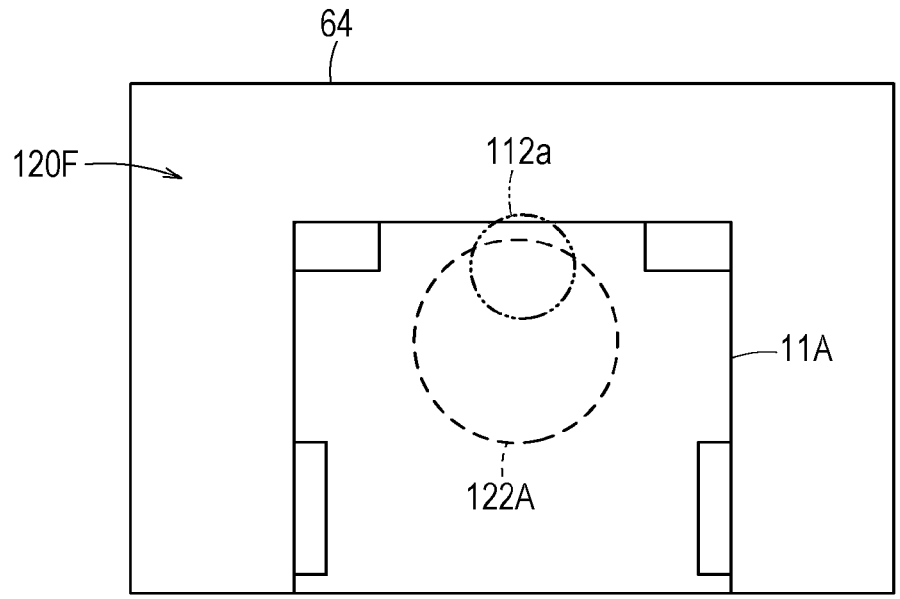
FIG. 11 is a schematic illustration of a charge position parking assistance image based on position prediction by odometry.

Practically, when the charge sign (target) 112 deviates from the imaging range of the camera 63, at the moment of the deviation, the image 120F may be displayed on the display device 64 based on position prediction by odometry as illustrated in the schematic illustration of the charge position parking assistance image of FIG. 11. On the image 120F, a schematic vehicle image 11A of the electric vehicle 11 along with the charge efficiency range 122A, and a schematic charge sign (target) 112a of the charge sign (target) 112 are displayed.

Figure 12:
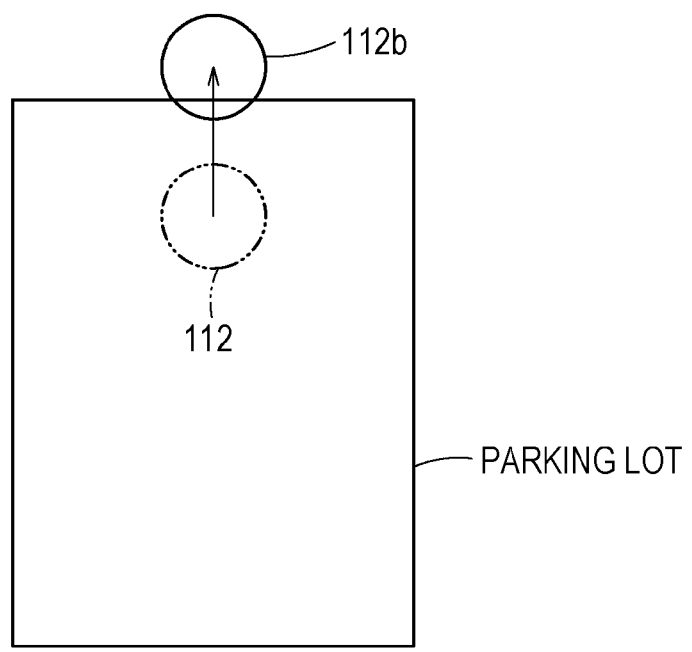
FIG. 12 is a schematic illustration of a charge position parking assistance image in the case where another charge sign at a position shifted from an actual charge sign is installed in a parking lot.

In the case where the camera 63 is unable to generate the image 120F based on position prediction by odometry and practically, the charge sign (target) 112 deviates from the imaging range of the camera 63 as the vehicle is moved back for positioning, another charge sign 112b, which is at a position shifted from the actual charge sign 112, may be prepared in the parking lot as illustrated in FIG. 12. The relative position between the actual charge sign 112 ((the power supplying coil L1) position of the power supplying unit 30) and (the power receiving coil L2 position of) the power receiving unit 50 is detected, thereby making it possible to calculate and display a charge efficiency range to be displayed on the screen.

Overview of Embodiment

As described above, the vehicle guidance apparatus 10 according to the present embodiment is mounted in the electric vehicle 11 that receives supply power P1 in a non-contact manner by the power receiving unit 50 on the vehicle side, the supply power P1 being supplied from the power supplying unit 30 on the ground side, charges the battery 12 as a power storage device by the receive power P2, and is driven at least by the power stored in the battery 12.

The vehicle guidance apparatus 10 guides the electric vehicle 11 so that the relative position between the power receiving unit 50 and the power supplying unit 30 falls within a predetermined range, the vehicle guidance apparatus 10 including: a power supplying parameter acquisition unit 86 configured to acquire a power supplying parameter by the vehicle, the power supplying parameter (type) corresponding to a specification (type) of the power supplying unit 30 on the ground side; a power receiving parameter storage unit 89 configured to store a power receiving parameter (type) corresponding to a specification (type) of the power receiving unit 50; a charge efficiency calculation unit 87 configured to calculate a charge efficiency η according to the relative position between the power supplying unit 30 and the power receiving unit 50, based on the power supplying parameter and the power receiving parameter; and a display processing unit 88 configured to display a charge efficiency range ηa with respect to the power receiving centers 49C, 51C on the display device 64 as a display unit.

According to the present embodiment, when a charge efficiency η is displayed on the display device 64, charge efficiency range ηa with respect to the power receiving centers 49C, 51C are displayed, the charge efficiency being calculated according to the relative position between the power supplying unit 30 and the power receiving unit 50 based on a power supplying parameter and a power receiving parameter corresponding to the specification of the power supplying unit 30 on the ground side. Thus, as one example, it is sufficient for a driver (automatic drive is also included) to drive the vehicle so that a target (for example, the charge sign (target) 112 which is the position sign of the power supplying unit 30) falls within the displayed charge efficiency range ηa, and consequently, parking accuracy with respect to the power supplying unit 30 on the ground side in consideration of the charge efficiency η can be assured sufficiently as needed, and mental stress of a driver for positioning the vehicle with respect to the charge sign (target) 112 can be reduced.

In this situation, when the charge efficiency range 126, 128 (see FIG. 9B) at least in a vehicle width direction for a predicted direction of the vehicle movement is displayed on the display device 64, it is preferable to apply the display processing unit 88 primarily to the power supplying unit 30 (the power supplying coil L1p illustrated in FIG. 3B) on the ground side capable of generating induced magnetic flux in a front-rear direction of the vehicle.

Similarly, when the charge efficiency range 130, 122 (see FIG. 9C) at least in a front-rear direction for a predicted direction of the vehicle movement is displayed on the display device 64, it is preferable to apply the display processing unit 88 primarily to the power supplying unit 30 (the power supplying coil L1r illustrated in FIG. 3A) on the ground side capable of generating induced magnetic flux in an up-down direction of the vehicle.

Preferably, when the power supplying coil L1 is a circular coil (power supplying coil L1r), the charge efficiency range is displayed in a circular form or a rectangular form corresponding to the circular form, the rectangular form being defined by line segments in a front-rear direction and in a vehicle width direction (right-left direction). On the other hand, when the power supplying coil L1 is, for example, a rectangular coil that generates magnetic flux in a front-rear direction, in a vehicle width direction (right-left direction) perpendicular to the front-rear magnetic flux generation direction on the same plane, the charge efficiency range is displayed in the same direction (see FIG. 9B) as the magnetic flux generation direction or displayed in the front-rear direction (see FIG. 9C).

It should be noted that the power supplying parameter acquisition unit 86 is configured to acquire the power supplying parameter from the ground-side antenna 33 provided in the power supplying unit 30 via the vehicle-side antenna 69 provided in the vehicle, and thus the power supplying parameter can be easily acquired.

Figure 13:
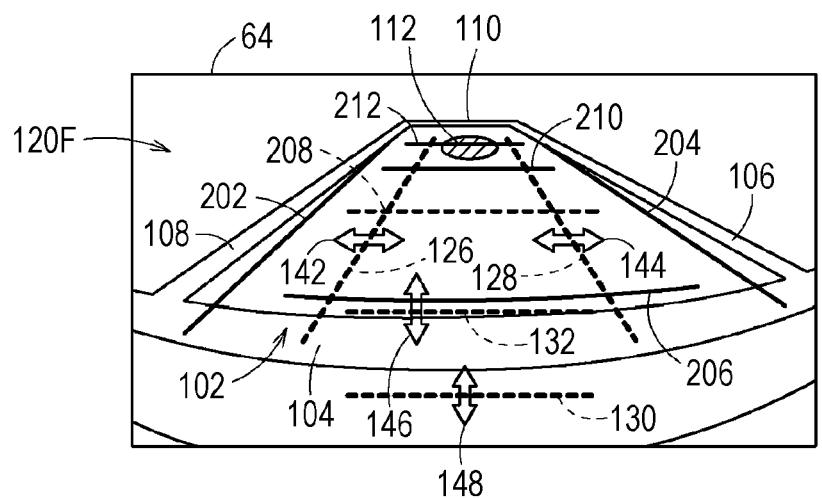
FIG. 13 is an explanatory diagram of increased or decreased charge efficiency ranges.

Practically, the charge efficiency calculation unit 87, when acquiring the power supplying parameter, refers to the compatibility characteristics table 100, and as indicated by arrows 142, 144, 146, 148 in the image 120F illustrated in FIG. 13, the width of the charge efficiency range 126, 128 (charge guide line) and the frame size of the charge efficiency range 130, 132 are variably (determined) displayed by the display processing unit 88.

In addition, the power supplying parameter acquisition unit 86 may acquire the power supplying parameter of the power supplying unit 30 from the navigation device 66 of the vehicle, the power supplying parameter corresponding to the current vehicle position (vehicle power receiving position).

Furthermore, the control device 42 may communicate with a server outside the vehicle and stores the compatibility characteristics table 100 illustrated in FIG. 5 on the server, the compatibility characteristics table being verified through simulation or experiments, and may download a charge efficiency range ηa from the server outside the vehicle, the charge efficiency range corresponding to the current vehicle power receiving position of the power charging station (parking lot).

It should be noted that the present disclosure is not limited to the above-described embodiment and various configuration may be adopted based on the description in the claims.

A vehicle guidance apparatus according to the present disclosure is to be mounted on an electric vehicle that receives supply power by a power receiving unit in the vehicle in a non-contact manner, charges a power storage device mounted in the vehicle by the received power, and is driven at least by the power stored in the power storage device, the supply power being supplied from a power supplying unit on the ground side, the vehicle guidance apparatus for guiding the electric vehicle so that a relative position between the power receiving unit and the power supplying unit is in a predetermined range, the vehicle guidance apparatus including: a power supplying parameter acquisition unit configured to acquire a power supplying parameter in the vehicle, the power supplying parameter corresponding to a specification of the power supplying unit; a power receiving parameter storage unit configured to store a power receiving parameter corresponding to a specification of the power receiving unit; a charge efficiency calculation unit configured to calculate a charge efficiency according to the relative position between the power supplying unit and the power receiving unit based on the power supplying parameter and the power receiving parameter; and a display processing unit configured to display a range of the charge efficiency with respect to a center of the power receiving unit on a display unit.

According to the present disclosure, when a charge efficiency is displayed on the display unit, the charge efficiency range with respect to the power receiving center is displayed, the charge efficiency being calculated according to the relative position between the power supplying unit and the power receiving unit, based on the power supplying parameter and the power receiving parameter corresponding to the specification of the power supplying unit on the ground side. Thus, for example, it is sufficient for a driver (automatic drive is also included) to drive the vehicle so that a target (for example, the position sign of the power supplying unit) falls within the displayed charge efficiency range, and consequently, parking accuracy with respect to the power supplying unit on the ground side in consideration of the charge efficiency can be assured sufficiently as needed, and mental stress of a driver for positioning the vehicle to the target can be reduced.

It should be noted that for example when the power receiving coil is a circular coil, the power receiving center is the center of the circle of the circular shape, and when the power receiving coil is a rectangular (rectangular parallelepiped such as a rectangular tube, a rectangular prism) coil, the power receiving center is the center of the rectangular parallelepiped. The central axis of a circular coil indicates an axis which is through the center of the circle of the circular shape and extends in a vertical direction same as the direction of a magnetic path, and the central axis of a rectangular coil indicates an axis which is through the center of the rectangular parallelepiped and parallel to the direction of a magnetic path.

In addition to an electric vehicle so-called EV that is driven only by the power storage device, the electric vehicle, on which the vehicle guidance apparatus according to the present disclosure is mounted, is directed to a vehicle which can be charged by external power, such as a hybrid vehicle, a range extender automobile each equipped with an engine, and a fuel cell automobile equipped with fuel cells.

The display processing unit displays the charge efficiency range on the display unit at least in a vehicle width direction for a predicted direction of movement of the vehicle, and thus a driver can easily guide the vehicle to the charge efficiency range in a vehicle width direction.

Similarly, the display processing unit displays the charge efficiency range on the display unit at least in a vehicle front-rear direction for a predicted direction of movement of the vehicle, and thus a driver can easily guide the vehicle to the charge efficiency range in a front-rear direction.

The charge efficiency calculation unit, when calculating the charge efficiency, may use the same set of parameter as the power supplying parameter and the power receiving parameter for both a power supplying coil and a power receiving coil, the same set of parameter including at least one of a number of coil turns, a shape, a coil diameter, Q value, an inductance value, and an operating frequency.

In addition, the power supplying parameter acquisition unit may acquire the power supplying parameter from an on-ground antenna provided in the power supplying unit via a vehicle-side antenna provided in the vehicle.

Furthermore, the power supplying parameter acquisition unit may acquire the power supplying parameter of the power supplying unit from a navigation device of the vehicle, the power supplying parameter corresponding to a current power receiving position of the vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle guidance apparatus to be mounted on an electric vehicle that receives supply power by a power receiving unit in the vehicle in a non-contact manner, charges a power storage device mounted in the vehicle by the received power, and is driven at least by the power stored in the power storage device, the supply power being supplied from a power supplying unit on the ground side, the vehicle guidance apparatus for guiding the electric vehicle so that a relative position between the power receiving unit and the power supplying unit is in a predetermined range, the vehicle guidance apparatus comprising:

a power supplying parameter acquisition unit configured to acquire a power supplying parameter in the vehicle, the power supplying parameter corresponding to a specification of the power supplying unit;

a power receiving parameter storage unit configured to store a power receiving parameter corresponding to a specification of the power receiving unit;

a charge efficiency calculation unit configured to calculate a charge efficiency according to the relative position between the power supplying unit and the power receiving unit based on the power supplying parameter and the power receiving parameter; and a display processing unit configured to display guide lines indicating a position of the vehicle, and display a range of the charge efficiency, based upon the calculated charge efficiency, with respect to a center of the power receiving unit on a display unit, the displayed range of the charge efficiency displaying an allowable deviation between the power supplying unit and the power receiving unit in which the charge efficiency can be achieved as a plurality of lines or a circular form, wherein the charge efficiency calculation unit, when calculating the charge efficiency, uses the same type of parameters for the power supplying parameter and the power receiving parameter for both a power supplying coil and a power receiving coil, the types of parameters including at least one of a number of coil turns, a shape, a coil diameter, Q value, an inductance value, and an operating frequency, and wherein the charge efficiency is a possible charge efficiency that is calculated before the power storage device is charged by the received power, and the display processing unit is configured to display the range of the charge efficiency before the power storage device is charged by the received power.

2. The vehicle guidance apparatus according to claim 1, wherein the display processing unit displays the charge efficiency range on the display unit at least in a vehicle width direction for a predicted direction of movement of the vehicle.

3. The vehicle guidance apparatus according to claim 1, wherein the display processing unit displays the charge efficiency range on the display unit at least in a vehicle front-rear direction for a predicted direction of movement of the vehicle.

4. The vehicle guidance apparatus according to claim 1, wherein the power supplying parameter acquisition unit acquires the power supplying parameter from an on-ground antenna provided in the power supplying unit via a vehicle-side antenna provided in the vehicle.

5. The vehicle guidance apparatus according to claim 1, wherein the power supplying parameter acquisition unit acquires the power supplying parameter of the power supplying unit from a navigation device of the vehicle, the power supplying parameter corresponding to a current power receiving position of the vehicle.

6. The vehicle guidance apparatus according to claim 1, wherein the display processing unit is configured to display the range of the charge efficiency and a target that represents the power supplying unit as features superimposed on an image captured by a camera on the vehicle.

7. The vehicle guidance apparatus according to claim 1, wherein the display processing unit is configured to simultaneously display a plurality of ranges of the charge efficiency with different respective sizes.

8. The vehicle guidance apparatus according to claim 1, wherein the display processing unit is configured to display the charge efficiency range with an elliptical shape.

9. The vehicle guidance apparatus according to claim 1, wherein the display processing unit is configured to display the range of the charge efficiency and a target that represents the power supplying unit as features superimposed on an image captured by a camera on the vehicle, the charge efficiency range representing a range of locations to which the target may be positioned to achieve the calculated charge efficiency.

10. The vehicle guidance apparatus according to claim 1, wherein the charge efficiency calculation unit, when calculating the charge efficiency, uses the same type of parameters for the power supplying parameter and the power receiving parameter include at least one of the number of coil turns, the shape, the coil diameter, Q value, and the operating frequency.

11. The vehicle guidance apparatus according to claim 1, wherein the charge efficiency calculation unit is configured to calculate a non-zero charge efficiency before the power storage device is charged by the received power.

12. The vehicle guidance apparatus according to claim 1, wherein the display processing unit is configured to display the range of the charge efficiency at a position that represents a relative position of the power receiving coil.

13. A vehicle guidance apparatus to be mounted on an electric vehicle including a power receiver configured to receive supply power in a non-contact manner from a power supplier provided on a ground side to charge a storage device, the vehicle guidance apparatus comprising:

a power supplying parameter acquisition device configured to acquire in the electric vehicle a power supplying parameter which corresponds to a specification of the power supplier;

a power receiving parameter storage device configured to store a power receiving parameter corresponding to a specification of the power receiver;

a charge efficiency calculator configured to calculate a charge efficiency according to a relative position between the power supplier and the power receiver based on the power supplying parameter and the power receiving parameter; and a display processing device configured to display on a display guide lines indicating a position of the electric vehicle, and a range of the charge efficiency, based upon the calculated charge efficiency, with respect to a center of the power receiver to guide the electric vehicle, the displayed range of the charge efficiency displaying an allowable deviation between the power supplier and the power receiver in which the charge efficiency can be achieved as a plurality of lines or a circular form, wherein the charge efficiency calculator, when calculating the charge efficiency, uses a same type of parameters for the power supplying parameter and the power receiving parameter for both a power supplying coil and a power receiving coil, the types of parameters including at least one of a number of coil turns, a shape, a coil diameter, Q value, an inductance value, and an operating frequency, and wherein the charge efficiency is a possible charge efficiency that is calculated before the storage device is charged by the received supply power, and the display processing unit is configured to display the range of the charge efficiency before the storage device is charged by the received supply power.

14. The vehicle guidance apparatus according to claim 13, wherein the display processing device displays the range of the charge efficiency on the display at least in a vehicle width direction for a predicted direction of movement of the electric vehicle.

15. The vehicle guidance apparatus according to claim 13, wherein the display processing device displays the range of the charge efficiency on the display at least in a vehicle front-rear direction for a predicted direction of movement of the electric vehicle.

16. The vehicle guidance apparatus according to claim 13, wherein the power supplying parameter acquisition device acquires the power supplying parameter from an on-ground antenna provided in the power supplier via a vehicle-side antenna provided in the electric vehicle.

17. The vehicle guidance apparatus according to claim 13, wherein the power supplying parameter acquisition device acquires the power supplying parameter of the power supplier from a navigation device of the electric vehicle, the power supplying parameter corresponding to a current power receiving position of the electric vehicle.

18. The vehicle guidance apparatus according to claim 13, wherein the display processing device is configured to display the range of the charge efficiency at a position that represents a relative position of the power receiving coil.

19. A vehicle guidance apparatus to be mounted on an electric vehicle including power receiving means for receiving supply power in a non-contact manner from power supplying means provided on a ground side to charge a storage device, the vehicle guidance apparatus comprising:
power supplying parameter acquisition means for acquiring in the electric vehicle a power supplying parameter which corresponds to a specification of the power supplying means;
power receiving parameter storage means for storing a power receiving parameter corresponding to a specification of the power receiving means;
charge efficiency calculation means for calculating a charge efficiency according to a relative position between the power supplying means and the power receiving means based on the power supplying parameter and the power receiving parameter; and
display processing means for displaying on a display
guide lines indicating a position of the electric vehicle, and
a range of the charge efficiency, based upon the calculated charge efficiency, with respect to a center of the power receiving means to guide the electric vehicle, the displayed range of the charge efficiency displaying an allowable deviation between the power supplying means and the power receiving means in which the charge efficiency can be achieved as a plurality of lines or a circular form,
wherein the charge efficiency calculation means, when calculating the charge efficiency, uses the same type of parameters for the power supplying parameter and the power receiving parameter for both a power supplying coil and a power receiving coil, the types of parameters including at least one of a number of coil turns, a shape, a coil diameter, Q value, an inductance value, and an operating frequency, and
wherein the charge efficiency is a possible charge efficiency that is calculated before the storage device is charged by the received supply power, and the display processing means is configured to display the range of the charge efficiency before the storage device is charged by the received supply power.

20. The vehicle guidance apparatus according to claim 19, wherein the display processing means is configured to display the range of the charge efficiency at a position that represents a relative position of the power receiving coil.

21. A vehicle guidance method comprising:
acquiring in an electric vehicle a power supplying parameter which corresponds to a specification of a power supplier provided on a ground side;
storing a power receiving parameter corresponding to a specification of a power receiver which is provided in the electric vehicle and which is configured to receive supply power in a non-contact manner from the power supplier to charge a storage device;
calculating a charge efficiency according to a relative position between the power supplier and the power receiver based on the power supplying parameter and the power receiving parameter by using a same type of parameters for the power supplying parameter and the power receiving parameter for both a power supplying coil and a power receiving coil, the types of parameters including at least one of a number of coil turns, a shape, a coil diameter, Q value, an inductance value, and an operating frequency, the charge efficiency being a possible charge efficiency that is calculated before the storage device is charged by the received supply power;
displaying on a display guide lines indicating a position of the electric vehicle; and
displaying on the display a range of the charge efficiency, based upon the calculated charge efficiency, in which the charge efficiency can be achieved with respect to a center of the power receiver to guide the electric vehicle before the storage device is charged by the received supply power, the displayed range of the charge efficiency being a plurality of lines or a circular form that displays an allowable deviation between the power supplier and the power receiver in which the charge efficiency can be achieved.

22. The vehicle guidance method according to claim 21, wherein displaying on the display the range of the charge efficiency is performed by displaying the range of the charge efficiency at a position that represents a relative position of the power receiving coil.

* * * * *